Oct. 9, 1928.

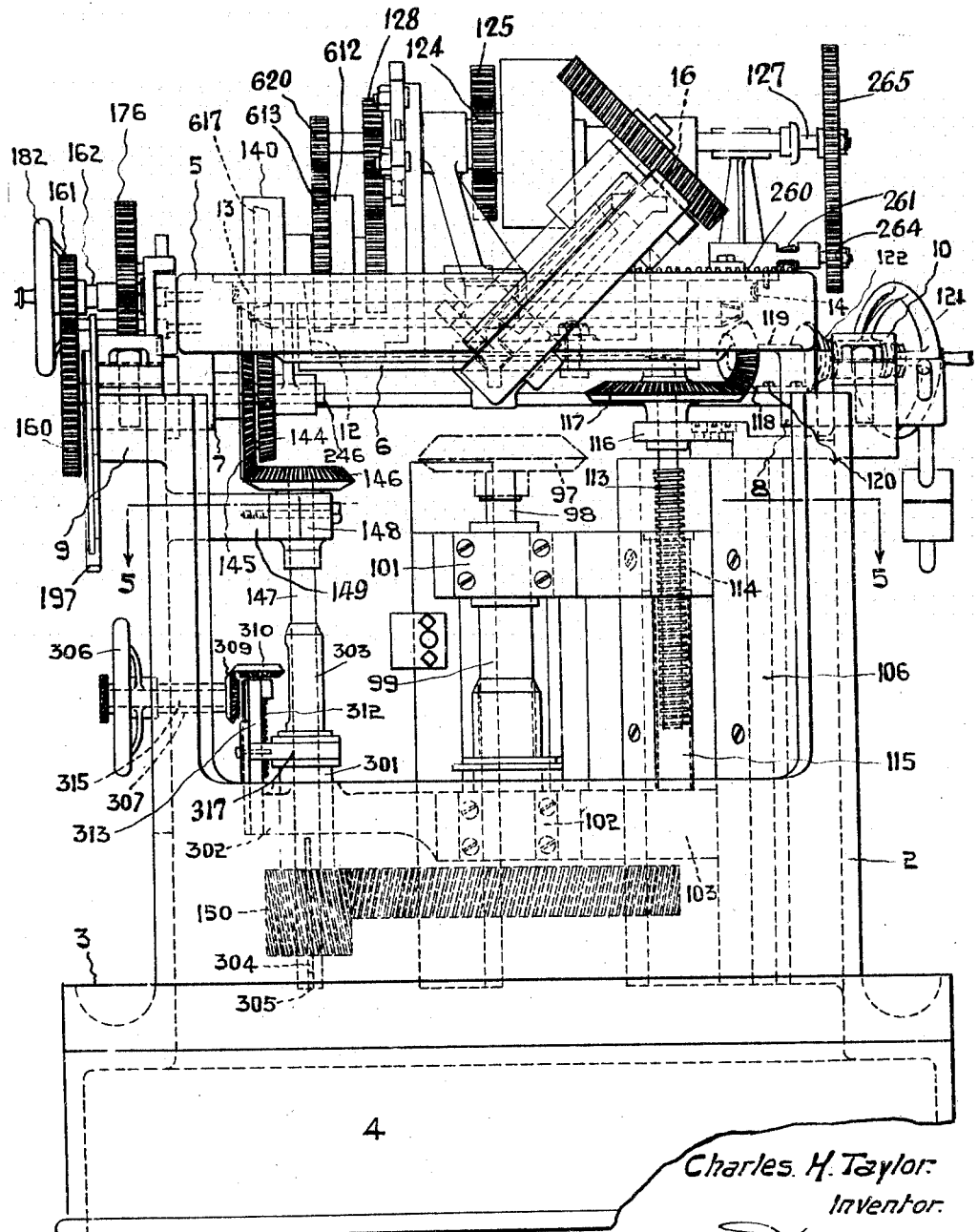

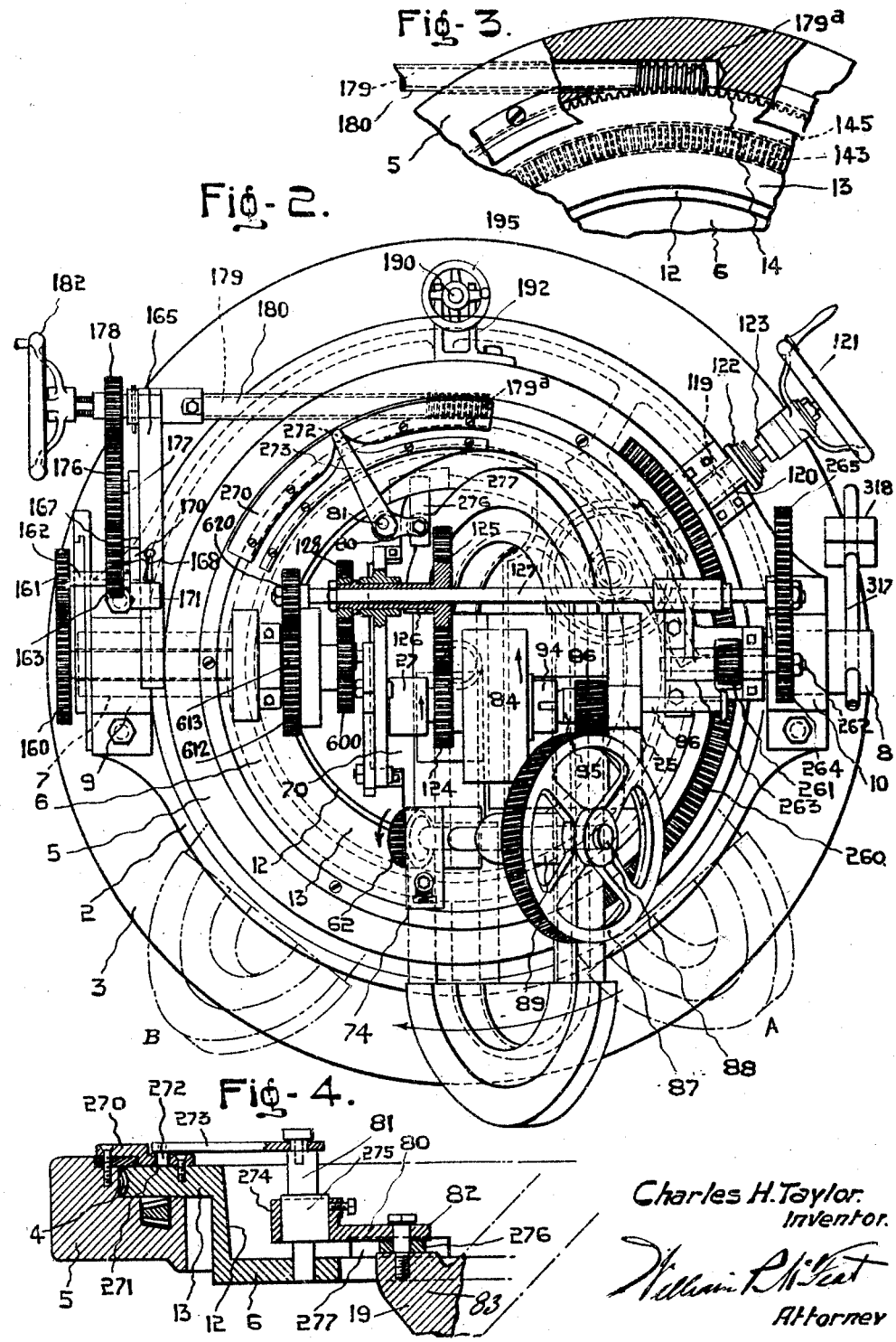

C. H. TAYLOR

BEVEL GEAR CUTTING MACHINE

Filed Nov. 13, 1920

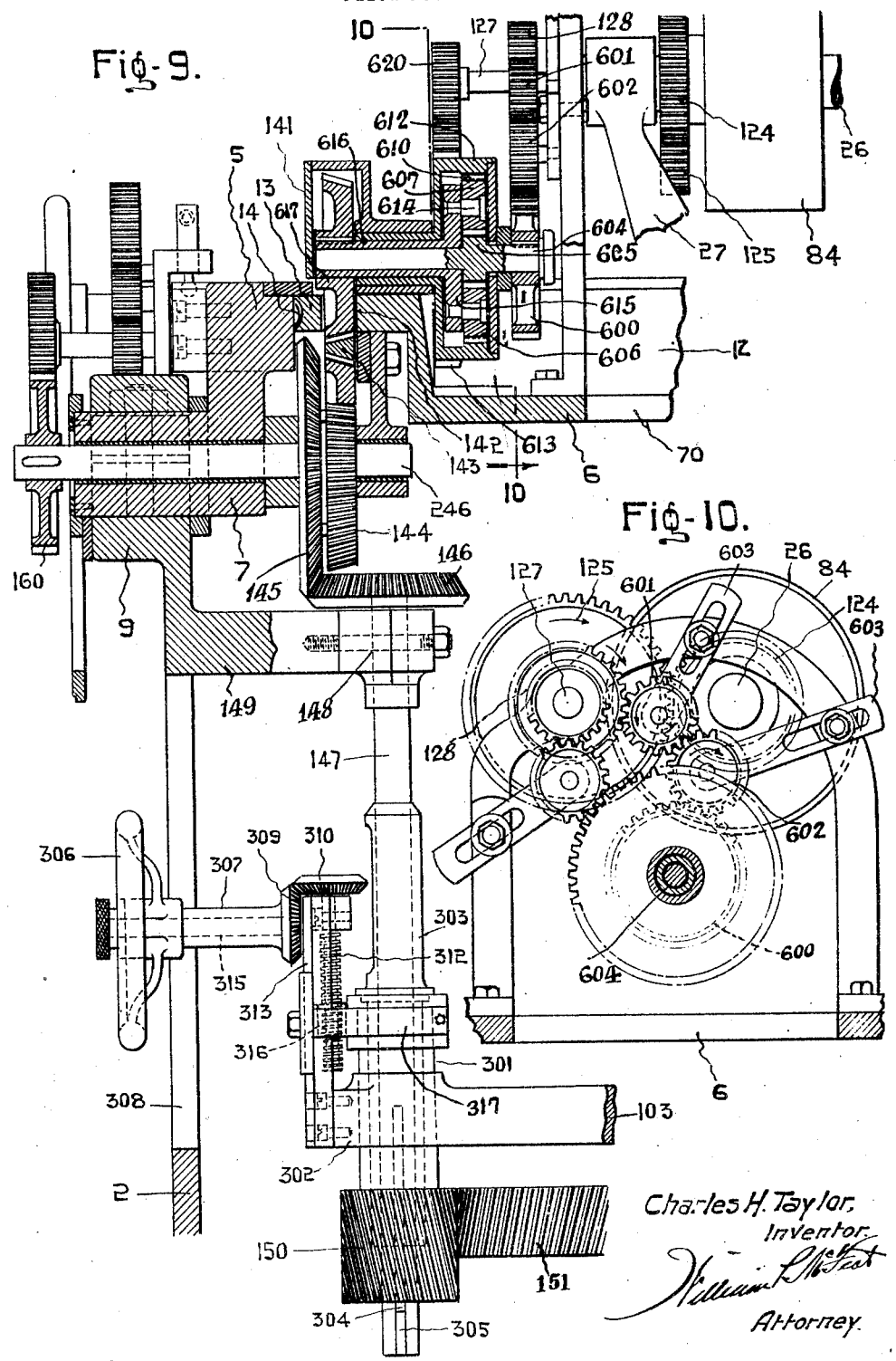

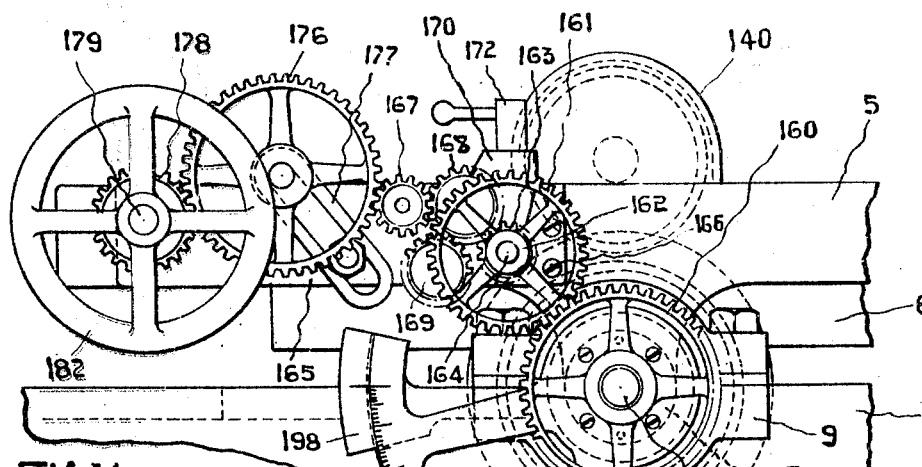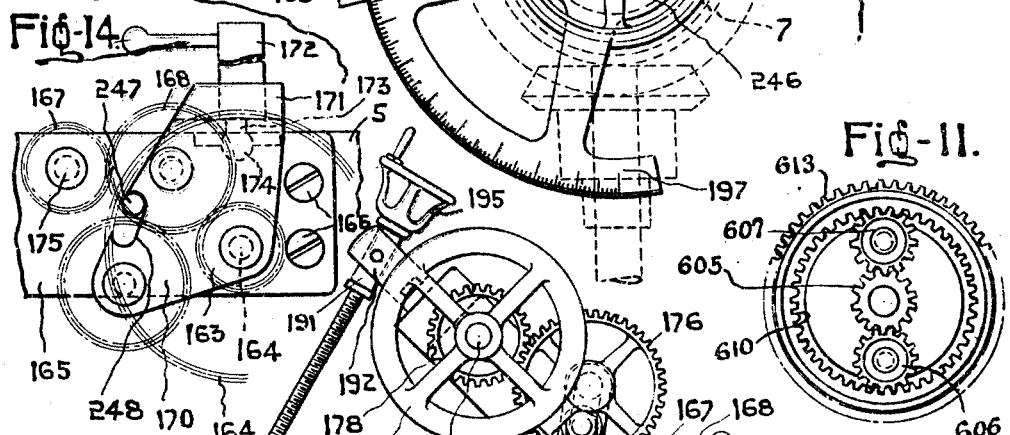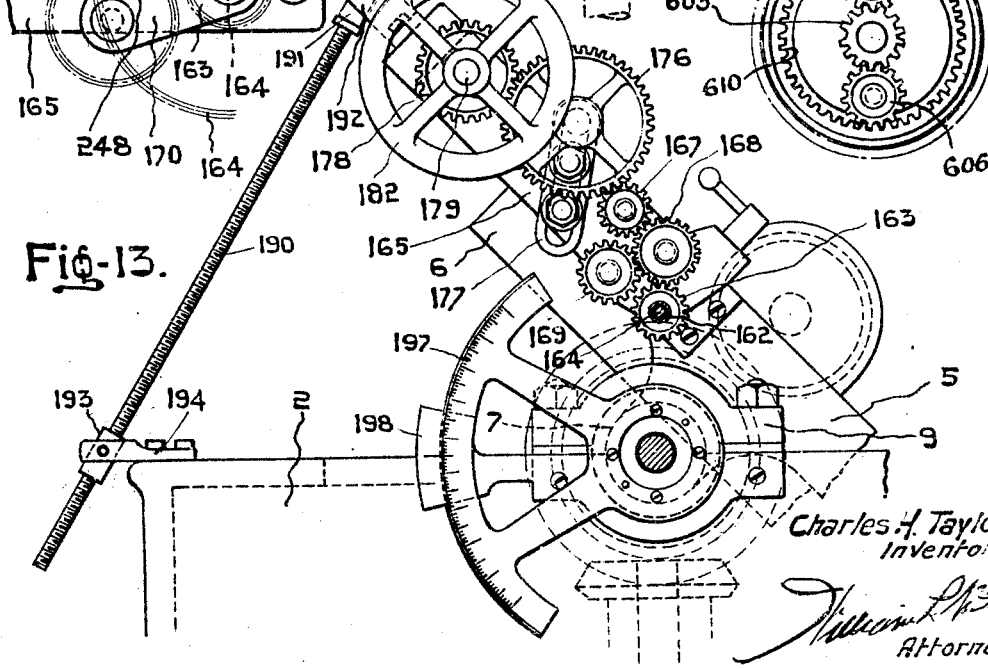

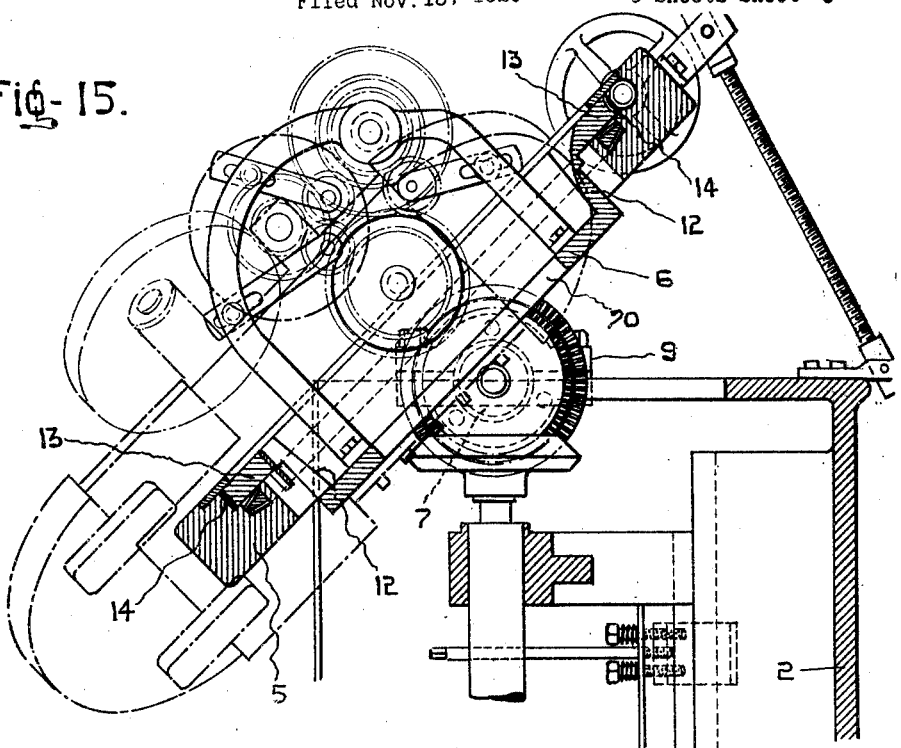

Oct. 9, 1928.
C. H. TAYLOR
1,687,150
BEVEL GEAR CUTTING MACHINE
Filed Nov. 13, 1920
9 Sheets-Sheet 7
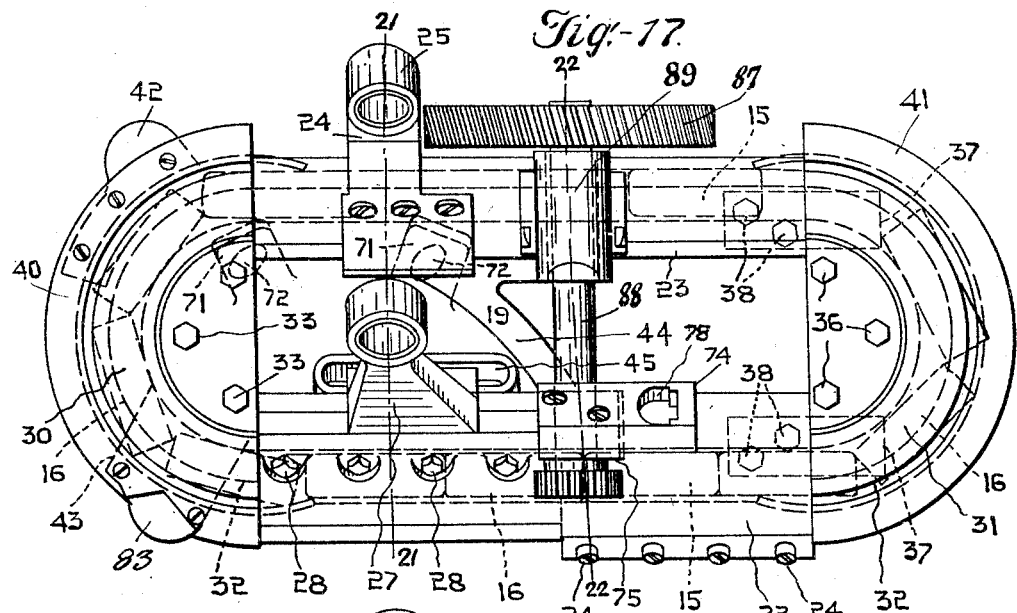
Fig. 17.
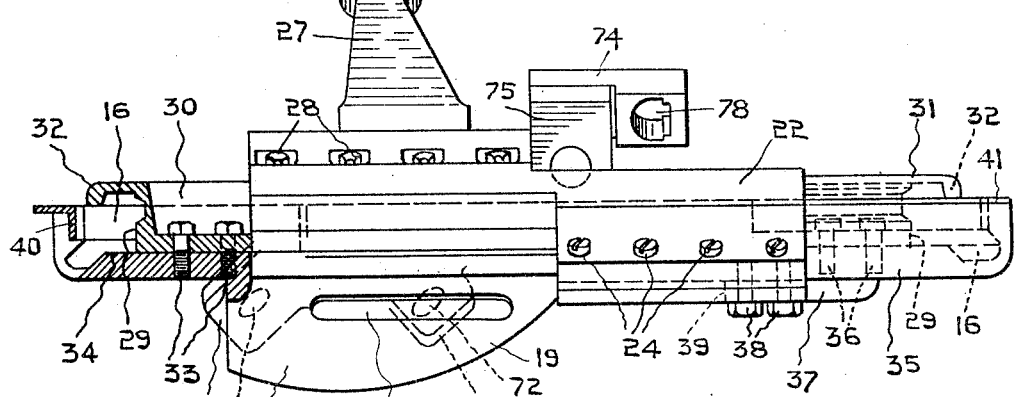
Fig. 18.
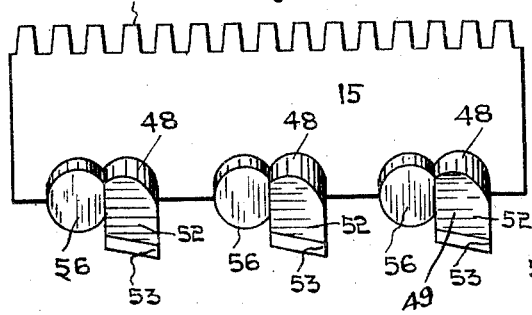
Fig. 19.
Fig. 20.
Inventor
Charles H. Taylor
William R. M?
Attorney

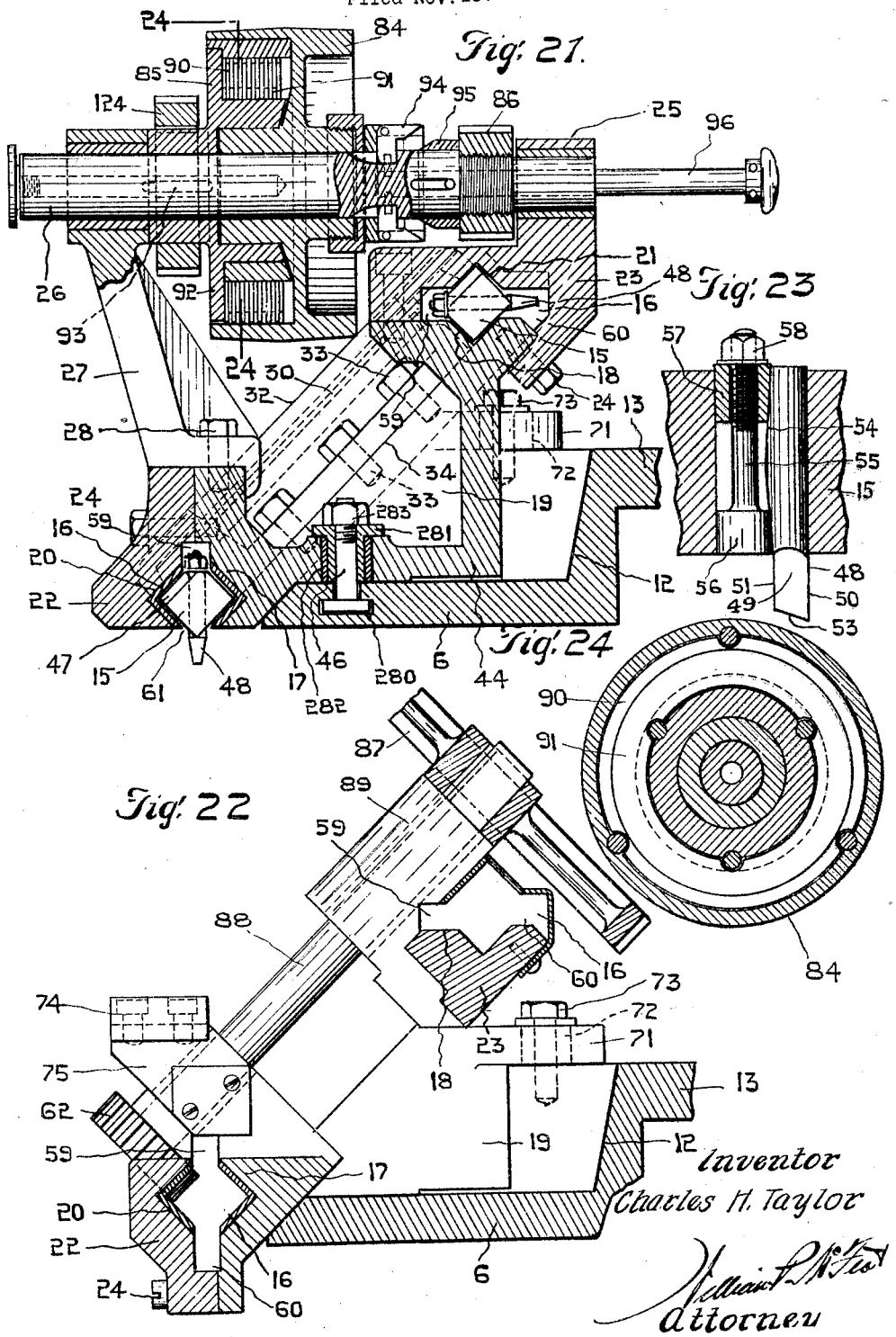

Oct. 9, 1928.  
C. H. TAYLOR  
1,687,150

BEVEL GEAR CUTTING MACHINE

Filed Nov. 13, 1920   9 Sheets-Sheet 9

Charles H. Taylor  
Inventor per Attorney

Patented Oct. 9, 1928.

1,687,150

UNITED STATES PATENT OFFICE.

CHARLES H. TAYLOR, OF TORONTO, ONTARIO, CANADA.

BEVEL-GEAR-CUTTING MACHINE.

Application filed November 13, 1920. Serial No. 423,926.

My invention has for its object to cut automatically in one continuous cycle of operation a spiral gear, the contour of the teeth essential to a perfect gear being generated progressively throughout all the teeth. To this end the invention may be said broadly to consist in the coaction of a rotary carrier for a conical blank, with a travelling train of cutters being disposed in the direction of a generatrix of the pitch cone, this train of cutters during such travel of the latter, being caused to swing in a substantially tangential direction with relation to the blank, the effect being that this cutting train is caused to cut or machine a complete spiral gear having perfectly uniform teeth, in one cycle of operation. Another feature of this invention is the synchronizing of the speed of travel of the train of cutters with the rotation of the blank.

Briefly stated the invention includes an endless train of cutters spaced to, in effect, produce a cutting rack which in cutting the blank, in continuous operation, intermeshes with the cuts thus made. In this manner the teeth make independent cuts in succession in the succeeding positions indexed by the rack and the gear is thereby cut, the tangential movement of the cutting train constantly changing the position of each cutter with relation to the blank and thus generating the side faces of the gear teeth.

For full comprehension, however, of my invention reference must be had to the accompanying drawings in which similar reference characters indicate the same parts, and wherein:

Figure 1 is a front elevation of a bevel gear cutting machine constructed according to my invention;

Figure 2 is a plan view thereof;

Figure 3 is a detail fragmentary plan view partly in section illustrating a part of the table rotating mechanism;

Figure 4 is a detail fragmentary sectional view of the table, the carrier, and toolrace illustrating the means for causing a turning movement of the toolrace upon the table;

Figure 5 is a horizontal sectional view taken on line 5—5 Figure 1;

Figure 6 is a fragmentary sectional view of a part of the gear blank rotating and table rotating mechanism illustrating the operative connection between the gears mounted upon the table and revoluble therewith and those located in fixed position;

Figure 7 is a fragmentary view of a portion of the mechanism carried by the table for accelerating the speed of rotation of the gear blank to compensate for the difference in speed of the table and gear blank due to their relative angular positions;

Figure 8 is a detail fragmentary sectional view of the table carrier and toolrace illustrating one of the points of connection of the toolrace to the table;

Figure 9 is a fragmentary vertical sectional view illustrating the table rotating and gear blank rotating mechanism;

Figure 10 is a sectional view taken on line 10—10 Figure 9;

Figure 11 is a detail view of the differential mechanism forming a part of the drive illustrated in Figure 10;

Figure 12 is a fragmentary side view of the machine illustrating a part of the mechanism for rotating the table the latter being shown in horizontal position;

Figure 13 is a similar view to Figure 12 but illustrating the table in inclined position and the means for tilting the same to such position;

Figure 14 is a detail view illustrating in diagram the gears forming a part of the table rotating mechanism which enable such rotation to be reversed;

Figure 15 is a vertical sectional view taken through the centre of the machine and illustrating the toolrace in diagram, the table being shown in inclined position;

Figure 16 is a similar view to Figure 15, showing the table in horizontal position;

Figure 17 is a plan view of the toolrace per se.

Figure 18 is a side elevation thereof;

Figure 19 is a detail side view of one of the cutter blocks;

Figure 20 is an end view thereof;

Figure 21 is a sectional view taken on line 21—21 Figure 17 and illustrating the parts associated with toolrace in place;

Figure 22 is a fragmentary sectional view taken on line 22—22 Figure 17;

Figure 23 is a detail sectional view of a cutter block illustrating the means for securing each cutter in place;

Figure 24 is a sectional view taken on line 24—24 Figure 21;

Figure 25:
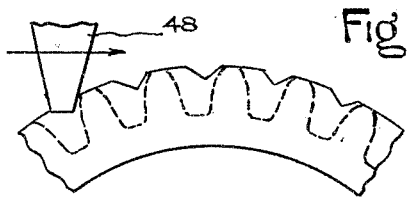
Figures 25, 26, 27 and 28 illustrate diagrammatically positions of the cutters relatively to the cuts during progressing stages of the operation.
Figure 26:
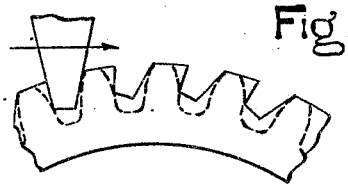
Figure 27:
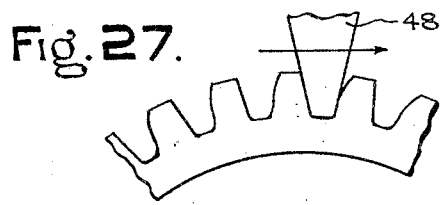

The machine illustrated is the preferred embodiment of my invention, and consists of a cylindrical member 2 presenting an open top and front and being flanged at its lower end as at 3 and supported upon the base 4. The open front permits ready access to the interior while the open top accommodates a tiltable unit for carrying the gear cutters. This tiltable unit comprises its frame which is the annular carrier 5 surrounding and rotatably carrying a table 6, the carrier having downwardly offset trunnions 7 and 8 located at diametrically opposite sides thereof and journalled in bearings 9 and 10 respectively on the top of the frame 2 in order to enable the cutters and their carrier to be tilted as a unit. The table 6 is circular in plan view and consists of a unitary casting having a surrounding side wall or flange 12 disposed perpendicularly to its main area with its top edge outwardly flanged as at 13 and toothed as at 14 to constitute a worm-wheel, this worm-wheel, forming one element of the mechanism for rotating the table to swing the cutters across the gear blank tangentially for the purpose of increasing the depths of the initial cuts on the blank and generating the side faces of the teeth to be formed. The flange 13 also supports the table upon the carrier and is seated in an annular recess in the top face of the carrier with the bottom of the table disposed slightly below the underside of the latter.

This table, as hereinbefore mentioned, is constructed and arranged to be rotated during the cutting operation and the unit may be tilted upon the trunnions 7 and 8 so that any desired bevel angle of gear blank may be operated on. However, before describing in detail these mechanisms, I will describe the cutting mechanism which is mounted upon the table.

Cutting mechanism.

This mechanism consists of a train of cutter blocks 15 disposed throughout the length of an endless toolrace 16 with their ends abutting, and slightly movable therein, whereby they are caused to form a cutting rack, the cutting teeth of which are adapted to effect uniformly spaced cuts in the face of the gear blank and subsequently intermesh therewith when increasing the depth of the same. The toolrace is disposed diametrically across the table and at an angle thereto when viewed in end elevation and it embraces the front of the table and carrier with its lower side disposed below the bottom of the table which is provided with a transverse opening 70 to accommodate the same. This opening is sufficiently large to permit of a turning movement of the toolrace relatively to the table. The toolrace is substantially rectangular in cross-section and is constituted by inner straight side walls 17 and 18 formed from a unitary casting 19, the outer straight side walls 20 and 21 being presented by detachable members 22 and 23 bolted to the casting 19 as at 24, the member 23 having a bracket 25 formed integrally therewith. This bracket supports one end of a shaft 26 forming a part of the mechanism for causing the cutter blocks to travel in the toolrace, the opposite end of the shaft being supported by a bracket 27 bolted to the toolrace as at 28. The present inner walls 29 at the end of the toolrace are formed by plates 30 and 31 of semi-circular form in plan view and Z-form in cross-section, disposed in position with their flanges 32 overhanging the raceway and constituting the top thereof. The plate 30 is bolted as at 33 upon a flat surface 34 presented by the inner end of the casting 19 while the plate 31 forms an element of a detachable part which is the outer end of the toolrace and consists of a casting 35 having the plate 31 bolted thereon as at 36. The casting 35 is adjustably connected to the casting 19 by lugs 37 and bolts 38, the bolts extending through slots 39 in the lugs and permitting of the necessary adjustment to take up slack between the blocks.

Semicircular members 40 and 41 of angular cross-section constitute the outer end walls of the toolrace, the member 40 being fastened upon lugs 42 and 43 on the casting 19 and the member 41 upon the detachable end 35.

The raceway when viewed from either end thereof is disposed at an angle of substantially 45° to the plane of the table, the cutters being constructed and arranged to cut into the face of the gear blank when moving along the lower side of the raceway. This inclination of the raceway is obtained by a web 44 of angular cross-section, the base of the web lying flat upon the table and having a slot 45 permitting the passage therethrough of a stud 46 mounted in fixed position upon the table. The toolrace is adapted to turn as a unit upon this stud during the cutting operation immediately after one side of each of the teeth of the blank has been generated so that the opposite side will extend in a plane intersecting the vertex of the pitch cone.

Each cutter block has its top side toothed so that collectively they form a rack 47 and each block rigidly carries preferably three cutters 48 uniformly spaced and disposed diagonally through the block with their cutting ends protruding therefrom as at 49 and adapted to form three independent spaced cuts in the face of the blank during travel across the same. The cutting end of each tooth presents front and back faces 50 and 51, respectively, disposed parallel to the length of the cutter, and side faces 52 which taper to a face 53 forming the extreme end of the tool, this face being also disposed at an angle to the faces 50 and 51, the corners presented by the faces 50, 52 and 53 constituting the cutting edges. In order to rigidly fasten each cutter within the block its shank is sheared off as at 54 towards its ends and a clamping bolt 55 having a wedge-shaped head and collar, 56 and 57 respectively, is inserted into the opening in the block through which the shank passes in juxtaposition with the latter, the opening being much larger than the shank. The head and collar bear against the wedge-shaped face 54 of the shank and clamp the same against the wall of the cutter block, this clamping action being obtained by tightening a nut 58.

As the nuts 58 and cutter ends project laterally from the cutter block it is essential that clearance be provided within the raceway. To this end the latter is extended laterally to present channels 59 and 60, the former accommodating the nuts and the latter the cutter ends, the cutters being active when moving along the straight lower side of the toolrace, the raceway at this point is sheared off to present a lateral opening 61 through which the cutters project.

As hereinbefore mentioned, the cutter blocks are disposed throughout the length of the toolrace with their ends abutting and their top sides are adapted to produce a continuous rack in intermeshing relation with the pinion 62 constituting one element of the mechanism for actuating the cutters, which mechanism will be presently further alluded to. Any slackness between the cutter blocks may be taken up by adjustably moving the outer end of the toolrace towards the opposite end thereof, the end being maintained in the adjusted position by the bolts 38. In order to facilitate movement of the cutter blocks as they travel around the ends of the raceway and incidentally to enable the cutter blocks to move along a straight line until the cutters have completed the cut, the ends of the raceway are of increased width, this increase in width being obtained by describing the outer wall of each end of the raceway upon a curve having a diameter greater than the distance between the outer side walls 20 and 21. The toolrace is connected to the table at five points, one being constituted by the stud 46. The other points of connection are constituted by a pair of lugs 71 formed integrally with the casting 19 and having openings 72 therein accommodating bolts 73, the openings being sufficiently large to permit of movement of the toolrace relatively to the table. A fourth point of connection is provided by a block 74 (Fig. 8) bolted upon the toolrace casting at 75 adjacent the front of the table and presenting a vertical face 76 abutting against the adjacent side of the latter, the abutting faces being of hardened steel. The block 74 is disposed in position overlapping the top of the table. The overlapping portion encircles a fixed stud 77 upon the front of the table, the opening 78 in the block accommodating the stud being also sufficiently large to permit of relative movement and containing a spring 79 bearing between the block and stud and adapted to resiliently maintain the block 75 abutting against the table. The fifth point of connection of the toolrace to the table is effected by a connecting rod 80 (Figs. 2 and 4) one end of which is pivoted on the shaft 81 journalled in the table while its opposite end 82 is pivoted to a lug 83. This connecting rod is an element of the means for turning the toolrace bodily upon the table during the cutting operation and this mechanism will also be presently alluded to.

*Cutter driving mechanism.*

The driving mechanism for the cutters (Figs. 1, 21 and 22) consists of the main driving shaft 26 journalled in brackets 25 and 27, a pulley 84 rotatably mounted thereon, a friction clutch 85 adapted to rotatively connect the pulley to the shaft, a skew pinion 86 keyed to said shaft and a skew gear 87 mounted upon the upper end of a shaft 88 disposed obliquely to the axial plane of the shaft 26 and parallel to the inclined plane of the raceway, this shaft being journalled at its upper end in a bearing 89 on the toolrace casting and at its lower end in a second bearing also in this casting, such lower end protruding beyond the bearing 75 and rigidly carrying the pinion 62.

It will be seen, therefore, that when the shaft 26 rotates, the skew pinion 86 will drive the skew gear 87 thereby rotating the pinion 62 and the pinion, through the continuous rack presented by the cutter blocks, (Fig. 19) moving the latter around the raceway and causing them during their travel to traverse the periphery of the gear blank. The friction clutch for rotatively connecting the pulleys to the main driving shaft consists of two series of rings 90 and 91 respectively, the former being constructed and arranged to rotate in unison with pulley 84 and the latter to rotate in unison with a disc 92 the disc having a hub encircling the hub of the pulley and being keyed to the main driving shaft as at 93. The pulley is hollow and accommodates both series with the rings of one series located between the rings of the other series for the purpose of obtaining a large frictional area whereby axial movement of the disc towards the pulley causes the two series to interlock, axial movement of the disc 92 is effected by a push-rod 96 adapted to move axially a tapered collar 95 to and from engagement with bell crank pawls 94. The latter engage the shaft 93 and exert a pull on such shaft when the rod 96 is pushed in. The friction clutch is operated by a push-rod 96. Obviously other well known means for transmitting power to the essential spiral gear cutting parts may be employed without departing from the spirit of my invention.

Tilting mechanism.

The mechanism for tilting the unit carrying the carrier 5, table 6 and mechanism supported thereon including the toolrace, is located at the rear of the machine, and its purpose is to so position the toolrace that the cutters will, when cutting into the periphery of the gear blank, move in an inclined path intersecting the vertex of the pitch-cone of the gear blank. This mechanism consists of a feed screw 190 (Fig. 13) the upper end of which is rotatably mounted in a collar 191 pivotally carried by a bracket 192 secured to the rear of the carrier. The lower end of the feed screw extends through a nut 193 pivoted on a bracket 194 secured to the top of the frame 2. A hand wheel 195 is mounted upon the upper end of the feed screw for the purpose of rotating the same.

This construction and arrangement of parts enables the table to be tilted to any desired angle according to the bevel angle of the root of the tooth of the gear blank to be cut.

In order to permit of fine adjustment the trunnion 7 has rigidly mounted thereon a graduated quadrant 197 constructed and arranged to be swung in unison with the tiltable unit, a pointer 198 indicating the degrees of the angle of inclination. The pointer is constituted by a plate like member bolted to the frame 2.

Gear blank supporting mechanism.

The gear blank is indicated in dotted lines as at 97 in Figure 1, and is supported upon an arbor 98 on the upper end of a vertically disposed spindle 99 the spindle being located centrally of the frame 2 with its axial plane coinciding with the vertical plane of the trunnions of the carrier. This spindle is journalled in bearings 101 and 102 in a vertically slidable carrier 103 the carrier including a slide 107 (Fig. 5) movable in a slideway 104 presented by plates 105 fastened to an inward projection 106 on the frame 2. In order to present an additional bearing for the carrier in its vertical movement, the latter is extended rearwardly as at 108 and bears against a flat face 109 of a rib 110 upon the frame 2. This rearward extension of the carrier has a clamp 112 bolted thereon which is adapted to clamp the carrier upon the rib 110 when the carrier has been adjusted to the desired position relatively to the cutting train.

The mechanism for vertically moving the carrier for the purpose of positioning the cutters relatively to the cutting train consists of a feed screw 113 extending through an internally screw-threaded bushing 114 in the carrier the lower end of the feed screw being encased by a tube 115 mounted upon the carrier and constituting a dust guard. The upper end of the feed screw is journalled in a bracket 116 mounted upon the upper end of the projection 106 of the frame 2 and carries a bevel gear 117 in intermeshing relation with a bevel pinion 118 on the inner end of a radially disposed shaft 119 journalled in a bearing 120 bolted to the top of the frame of the machine the outer end of this shaft having a hand-wheel 121 rotatively mounted thereon and a graduated collar 122 for permitting of fine adjustment of the carrier.

In order to prevent the gear blank from being thrown out of adjustment relatively to the train of cutters by inadvertently moving the hand-wheel, the latter is freely rotatable upon the shaft and is adapted to be connected thereto through a clutch 123. This construction and arrangement of parts enables rotative connection between the hand-wheel to be broken when the adjustment of the carrier is obtained.

In the operation of this mechanism, it will be seen that as the pinion 118 is rotated by the hand-wheel it will impart rotation to the bevel gear 117 thereby causing the carrier to feed up or down the feed screw according to the direction of rotation of the latter, this verical movement of the carrier moving the gear blank to or from the path of the cutters. This adjustment of the gear blank relatively to the cutting path is, of course, effected before the cutting operation takes place.

Gear blank rotating mechanism.

The driving power for continuously rotating the gear blank as the cutters traverse its periphery is obtained from the main driving shaft 26 and the mechanism which effects an operative connection between this shaft and the gear blank carrying spindle includes a train of gears common to the mechanism for rotating the table. This driving mechanism consists of a spur gear 124 rigidly mounted upon the left end of the shaft 26 and intermeshing with a second spur gear 125 mounted upon one end of a sleeve 126 (Fig. 2) encircling a shaft 127 and carrying at its opposite end a pinion 128 rotatably connected to a gear 600 through a pair of idlers 601 and 602 (Fig. 10) carried by adjustable arms 603 on a bracket of inverted U-form secured to the table, the object of the adjustable arms being to permit of the idlers being replaced by other gears having a greater or lesser number of teeth according to the number of teeth desired on the blank. The gear 600 is secured upon a short horizontally disposed shaft 604 (Fig. 9) adapted to revolve with the table. Between its ends it is formed integrally with a pinion 605 (Figs. 9 and 11) forming a part of a differential mechanism which has as additional elements pinions 606 and 607 both intermeshing with the intermediate pinion 605 and an internal gear 610. The latter is constituted by the toothed circumferential wall of a housing 612 which is also externally toothed as at 613 for a purpose to be hereinafter described. The pinions 606 and 607 are rotatably mounted upon studs 614 on a disc 615 and are adapted to revolve with the latter which is extended outwardly relatively to the table in the form of a sleeve 616 encircling the shaft 604 and having a bevel pinion 617 keyed upon it. This bevel pinion is enclosed in a housing 141 and extends downwardly through an opening 142 in the table 6 and carrier 5 and intermeshes with the top face of a floating rack 143 the bottom face of which is also toothed and intermeshes with a second bevel pinion 144. This rack is of ring form and is located immediately beneath the flange 13 of the table in a circular groove 145¹ in the carrier 5 see Figure 7.

The pinion 144 is keyed upon a shaft 246 extending through the trunnion 7 which is hollow. Rigidly connected to this pinion and rotatable therewith is a mitre gear 145 which intermeshes with a second mitre gear 146 mounted upon the upper end of a vertical shaft 147 journalled in a bearing 148 secured to a lug 149 on the machine frame. A spiral toothed pinion 150 is mounted upon the lower end of this shaft and is axially movable thereon. It intermeshes with a spiral toothed gear 151 on the lower end of the gear blank spindle 99.

The operation of the foregoing gear blank rotating mechanism is as follows:

When the pulley 84 is set in motion the spur gear 124 drives the spur gear 125 in the direction of the arrow (Figure 1), this motion being transmitted through the sleeve 126, pinion 128, idlers 601 and 602 to gear 600 and from thence through shaft 604, differential pinions 605, 606 and 607, disc 614, sleeve 615, bevel pinion 616 to rack 143. From the latter the drive to the gear blank is completed by the train consisting of gears 144, 145, 146, shaft 147, pinion 150 and gear 151 the latter being on the lower end of the gear blank spindle. From the foregoing it will be seen that the pulley 84 drives both the cutting train and the gear blank. It drives a third mechanism also, however, the mechanism for effecting rotation of the table 6.

*Table rotating mechanism.*

The drive from the pulley to the shaft 246 is common both to this last mentioned mechanism and the mechanism for rotating the gear blank. The operative connection between this shaft 246 and the table is effected by a train of gears located at the left of the machine. This train consists of a spur gear 160 keyed upon the end of the shaft 246 which protrudes from the trunnion 7, a second spur gear 161 intermeshing with gear 160 and rigidly mounted upon one end of a sleeve 162 carrying a spur pinion 163 substantially midway its length, the gears 160 and 161 being detachable for the purpose of enabling them to be replaced by other gears having different numbers of teeth to accelerate or reduce the movement at the table and consequently the rate of which the cutting train advances tangentially across the blank in its tooth cutting operation. The sleeve is rotatable upon a fixed shaft 164 upon a bracket 165 secured to the carrier 5 as at 166, the bracket being disposed at a tangent to the circumference of the carrier. The spur pinion 163 is rotatively connected to a spur pinion 167 through a pair of spur pinions 168 and 169 carried by a swinging arm 170 (Fig. 14) pivoted upon shaft 164 between the inner end of sleeve 162 and the bracket 165, the upper end of the arm having a portion 171 overhanging the bracket while the arm is limited in its movement by a stud 247 registering in a notch 248 in the side of the arm.

The object in mounting the spur pinions upon this frame is to enable them to be swung to position in which the pinion 168 will simultaneously intermesh with the spur pinion 163 and the spur pinion 167 or to another position with the spur pinion 169 intermeshing with spur pinion 167 and the spur pinion 168, the latter, of course, being in engagement with the spur pinion 163, as the arm swings upon the axis of the latter. This arrangement enables the direction of rotation of the table to be reversed when desired. Furthermore, the arm may be swung to a neutral position when it is desired to rotate the table by hand. The arm is adapted to be shifted to different positions by a manually operated pin 172 having an offset lower end 173 terminating in a bolt 174 fitting in a socket in the bracket 165. The spur pinion 167 is rotatably mounted on a fixed stud 175 and intermeshes with a spur gear 176, this last-mentioned gear being rotatable and detachably mounted upon an adjustable bracket 177 and intermeshing with a gear 178 upon a shaft 179 disposed parallel to the trunnion 7 and at a tangent to the table. This shaft carries at its inner end a worm 179 which is adapted to intermesh with the worm wheel 14 constituted by the toothed periphery of the table. In order to adjust the shaft for the purpose of taking up backlash between the worm and worm-wheel the former is supported in an eccentric sleeve 180 which extends through the bracket 165 with a snug fit and is fixed in any preferred manner. To take up play between the worm and worm wheel the sleeve is released and turned and owing to its eccentric bore moves the shaft 179 and consequently the worm towards or away from the worm wheel. The outer end of the shaft is provided with a handle 182 whereby the table may be manually rotated. When the latter is manually rotated the spur pinions 168 and 169 will be in neutral position.

Figure 28:
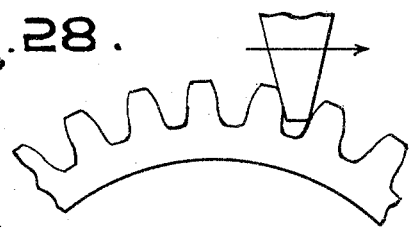

The toolrace moves with the table. Consequently as the latter rotates, the cutting train is swung around upon an axis intersecting the axial plane of the gear blank in the axis of the trunnions 7 and 8 and normally the cutters run nearly along an element of a cone the apex of which coincides with the point of intersection of the three axes mentioned and a part of the surface of which substantially coincides with the level surface of the gear blank. The swing of the cutter train produced by the rotation of the table carries the cutters in a straight tangential direction across the periphery of the blank simultaneously with their upward movement towards the apex of the cone as indicated in Figure 28, the successive cuts increasing in depth as the movement continues up to a point midway the tangential travel at which point the full depth of the cut is reached, the remaining travel generating the involute face opposite to that face generated by the cutters during the first half of their tangential travel.

The rack 143 performs a dual function: It not only acts as one element in the drive for the gear blank and table, but also synchronizes the speed of rotation of the gear blank with the speed of travel of the cutters whether the cutters are moving tangentially across the blank or not. When the latter is the case, it is necessary to accelerate the speed of rotation of the gear blank in order to cause the cutters to register with the initial cuts in the latter. This is accomplished by the rack in the following manner: As the table rotates the pinion 139 is moved with it and consequently the rack also, the movement of the rack causing rotation of the train of gears driving the gear blank spindle and consequently accelerating the latter in speed.

Differential mechanism.

It will be seen that the table is in a plane parallel to the side of the pitch-cone of the gear blank, and consequently its speed of rotation, where the cutters traverse the periphery of the blank, will be greater than the speed of rotation of the blank, proportionately as the angle of the cone decreases for the reason that the side of the cone is longer than the radius of the base of the cone. It is necessary therefore to provide differential mechanism for compensating for this difference in speed. To this end a segmental rack 260 is fastened in fixed position upon the carrier and intermeshes with a pinion 261 revoluble with the table, the pinion being rotatably carried by a shaft 262 journalled in a bracket 263. The outer end of this shaft has detachably mounted thereon and rotatable in unison therewith a pinion 264 which intermeshes with a spur gear 265 detachably mounted upon the right hand end of the shaft 127. The opposite end of the latter projects beyond the gear 128 and carries a pinion 620 which intermeshes with the gear 613 on the differential housing.

In the operation of this mechanism, as the table rotates the pinion 261 is caused to run along its rack 260 which, of course, being mounted upon the carrier, does not move. The rotation of the pinion, caused by this movement, rotates spur gear 265 through the spur pinion 264 and consequently shaft 127 and differential housing 612. This rotation of the housing through the internal gear 610 accelerates the speed of rotation of the differential pinions and this accelerated movement is transmitted through the various gears to the gear blank. When the angle of the table is altered, it is necessary to replace spur pinion 264 and spur 265 by other gears of the size required to produce the necessary accelerated movement required by the new angle.

Means for turning the toolrace upon the table.

As the side faces of the teeth of a bevel gear converge in the vertex of the pitch-cone the grooves between them must similarly converge and it is, in consequence, impossible to cut both sides of the grooves at the same time, it being necessary to cut the opposite sides which are the adjacent sides of contiguous teeth successively. The train is driven in an angular position relatively to the vertex to cut first one side of all the grooves of the complete gear and then the opposite side. To this end it is necessary to provide means for automatically altering the position of the toolrace relatively to the table during the cutting operation immediately after the cutters have formed one side of the cut. This cutting of one side of the cuts is completed and the other side commenced simultaneously with the coinciding of the lateral moving toolrace with the zenith of the rotating gear blank. The effect is, with the particular construction and arrangement of mechanisms disclosed that the cycloidal-toothed spiral gear is completely formed ready for use during one cycle of the machine which is the lateral or tangential travel of the toolrace from right to left (from dotted position "A" to "B" in Fig. 1). During this movement of the toolrace and cutters it is, as just mentioned, turned on its pivot at the exact moment its pivot point reaches a point coinciding with the gear blank's zenith. The cutting is done by opposite sides of the cutters in successive operation, each side when cutting being disposed in a plane intersecting the vertex of the pitch-cone. This turning of the tool-race at the desired moment is effected by a cam plate 270 mounted in fixed position upon the carrier and presenting a cam groove 271 in which a pin 272 is guided. This pin is carried by an arm 273 mounted upon the upper end of the shaft 81 hereinbefore mentioned in reference to the five points of connection of the toolrace to the table, the shaft being pivotally connected to the toolrace by the connecting link 80 one end of which is fastened to the shaft and the other to the lug 83 on the toolrace. In order to permit of adjustment of the toolrace relatively to the table, the arm is connected to the shaft through an eccentric collar 274 encircling an eccentric portion of the shaft 81. In order to prevent the angle of inclination of the toolrace to the table being changed when it is turned upon the latter, a tongue 276 is rigidly mounted upon the toolrace and slides in a guideway 277 in the adjacent portion of the table.

In the operation of the foregoing mechanism, as the table revolves the pin 272 moves along the cam groove 271 until it reaches an offset in the latter which offset, through the pin, causes a turning movement of the shaft 81. This turning movement of the shaft alters the position of the toolrace relatively to the table and causes the cutters to move in a new path relatively to the gear blank, the toolrace being turned about a centre immediately above the inner end of the tooth being cut in the gear blank. The toolrace does not turn upon a centre coinciding with the axial plane of the stud 46 as a combined sliding and turning motion takes place upon this stud, this turning movement being assisted by the block 74 which causes the toolrace to bear tightly against the front inner wall of the table as its position is altered, thereby producing a combined turning and sliding motion upon the stud.

In order to facilitate the sliding movement of the table upon stud 46 and permit of adjustment, the head of the stud is positioned within a T-groove 280 in the table and it is extended upwardly through an eccentric sleeve 281 in a sliding block 282 fitting the slide 45, displacement of the sleeve and slide block being prevented by a nut 283 screwed upon the upper end of the stud.

*Mechanism for rotating the gear blank independently of the driving mechanism.*

The purpose of this mechanism is to manually increase the width of the cut by permitting of rotation of the gear blank independently of the driving mechanism. It consists of means for axially moving the pinion 150 upon its shaft 147. To permit of this axial movement of the pinion, the latter is mounted upon the lower end of a sleeve 301 slidably projecting through a boring in the outer end of an arm 302 formed integrally with the carrier 103, the sleeve enclosing and being connected to the lower portion of a second sleeve 303. The pinion is caused to rotate in unison with the shaft 147 by a key 304 slidably fitting in a key-way 305 the key-way being of sufficient length to permit of axial movement of the pinion. The means for effecting axial movement consists of a hand-wheel 306 located outside of the frame 2 and mounted upon the outer end of the sleeve 307 rotatably mounted upon the stub shaft 315 and projecting through a slot 308 in the frame, the inner end of the sleeve carrying a mitre gear 309 intermeshing with a second mitre gear 310. The latter is mounted upon the upper end of a feed screw 312, the upper end of which is journalled in a vertical bracket 313 bolted to the arm 302; this bracket also supporting the shaft 315.

The feed screw passes downwardly through a square nut 316 mounted in a head 317 secured to the upper end of the sleeve 301.

When the hand-wheel is rotated the motion is transmitted to the feed screw through mitre gears 309 and 310 and the feed screw being held against axial movement, the nut 316 is caused to feed axially along the same, moving with it the sleeves 301 and 303 and pinion 150 and it is obvious that as the teeth on the pinion are spirally disposed, this axial movement will cause rotation of the gear 150 driving the gear blank spindle.

In order to balance the weight of the annular carrier and table when tilted, the trunnion 8 is provided with an arm 317 upon which the counterweight 318 is adjustably mounted.

*Operation.*

In the operation of my improved machine, a gear blank is first mounted upon the arbor 98.

Assuming a right-hand spiral is desired it being understood that a right hand spiral is one the teeth of which have their convex faces clockwise. The table is swung to carry the cutting train to one side of the blank. The blank is then adjusted vertically through the handle 121 to the proper operating position relatively to the cutters. The table is then tilted to an angle corresponding with the root of the teeth to be cut in the blank and the machine set in motion. This sets in motion the cutting train, the table carrying with it the cutting train, and the gear blank, the gear blank being rotated either in the opposite direction to the rotation of the table or in the same direction as desired and the cutting train being moved in an inclined path traversing the face of the gear blank and intersecting the vertex of the pitch-cone.

As the table is slowly rotated, moving with it the cutting train, the cutters move successively across the face of the blank, each cutter making a cut a distance of one or more teeth from the cut of the preceding cutter according to the relative spacing of the cutters. When the gear blank has completed one revolution its entire periphery will have a series of shallow cuts therein uniformly spaced apart. As the rotation of the table and gear blank continues, assuming the cutting train is being swung to the left, the cutters generate the right side faces of the teeth these faces being completed when the toolrace is substantially midway its movement from left to right. The continued movement of the toolrace on the latter half of its stroke causes the cutters to generate the left side faces of the teeth.

The operation is completed when the cutting train has swung with the table from one side of the gear blank to the other, the blank being toothed throughout its periphery and each tooth being of cycloidal form. The lateral movement of the toolrace in addition to causing the cutters to generate the faces of the teeth is also responsible for the progressively increasing depths of the cuts, this being due to the fact that the toolrace is swung in a flat plane tangentially to the blank and consequently is nearest the centre of the latter when midway the length of its lateral travel. After the cutters have generated, in this instance, the right side faces of the teeth and before they commence generating the left side faces thereof, the tollrace is automatically shifted upon the table to a position in which the active cutting edges of the cutters will generate the left side faces of the teeth in planes intersecting the vertex of the pitch cone.

The driving motion from the pulley 84 is transmitted to the cutting train through skew pinion 86, skew gear 87 and spur pinion 62 the latter successively intermeshing with the toothed faces of each block propelling the others around the raceway. The driving motion of the pulley is transmitted to the gear blank and table through spur gears 124 and 125, differential pinions 128, 229 and 230, shaft 127, spur gears 129, 130 and 132, (two of the latter are idlers and one only is required in cutting a left hand spiral), gear 137, bevel pinion 139, rack 143 and bevel pinion 144. From this point the drive for rotating the table and that for rotating the blank are separate and distinct. The drive for the blank consists of the bevel gears 145 and 146, shaft 147, spiral pinion 150, spiral gear 151 and gear blank spindle 99. The drive for the rotation of the table from the bevel pinion 144 is constituted by shaft 246, spur gears 160 and 161, spur pinions 163, 168, 169 and 167, spur gear 176, shaft 179, worm 179ª and the wormwheel presented by the toothed periphery of the table.

A cycle of operation of my machine completes a spiral gear ready for use, and is denoted by the swing of the cutting train from one side to the other of the blank which rotates continuously with uniform speed during the operation.

The cutters may be interchanged with others having inclined faces of different angles of inclination for right or left hand spirals or interchangeable blocks carrying such tools may be employed.

What I claim is as follows:

1. In a spiral gear cutting machine the combination of a blank carrier; means for continuously rotating the same; a train of cutters disposed in the direction of a generatrix of the pitch-cone of the gear blank; means for driving the cutter-train; means for swinging the latter on a center coincident with the axis of the gear blank to cause the cutters to traverse the gear blank tangentially; and means compensating for the difference in speeds of the gear blank-carrier, traversing motion and the cutter-train.

2. In a spiral gear cutting machine the combination of a blank carrier; means for turning the same, a train of cutters disposed in the direction of a generatrix of the pitch cone, means for driving the cutter train, means for swinging the latter to cause the cutters to traverse the gear blank, and means compensating for the difference in speeds of the gear blank-carrier and the traversing motion of the cutter-train.

3. In a spiral gear cutting machine the combination of a blank carrier, means for continuously rotating the same, a member pivoted on an axis intersecting the axis of the gear-blank carrier and carrying a toolrace disposed in the direction of a generatrix of the gear-blank; a train of cutters contained in the toolrace; means for driving the cutting train; means for swinging the member to cause the cutters to traverse the gear blank tangentially and means compensating for the difference in speeds of the gear blank carrier and the travel of the cutter train.

4. In a spiral gear cutting machine the combination of a blank carrier, means for continuously rotating the same, a member pivoted on an axis intersecting the axis of the gear blank carrier and carrying a toolrace disposed in the direction of a generatrix of the pitch-cone of the gear blank; a train of cutters contained in the toolrace; means for driving the cutting train, means for swinging the member to cause the cutters to traverse the gear blank tangentially; means compensating for the difference in speeds of the gear blank carrier and the travel of the cutter-train and means for adjusting the angular position of the toolrace to cut gears of different angular pitch-cone.

5. In a spiral gear cutting machine, a tiltable unit, a table rotatably mounted in the unit and carrying a slidable train of spiral-gear-cutters and means for driving the train of cutters radially relatively to the member and means for rotating the table to cause the cutting train to have lateral motion for the purpose set forth.

6. In a spiral gear cutting machine the combination with a blank-carrier and means for continuously rotating the same, of a tiltable member carrying a slidable train of spiral gear cutters, means for driving the train of cutters; means for swinging the member to cause the cutters to tangentially traverse the blank; and means compensating for the difference in speeds of the gear blank carrier and the travel of the cutter train for the purpose set forth.

7. In a spiral gear cutting machine, a tiltable member carrying a slidable train of spiral-gear-cutters means for driving the train of cutters and means for adjusting the angular position of the member to set the train of cutters in desired angular position to cut gears of different angular pitch-cone.

8. In a spiral gear cutting machine, a tiltable unit, a table rotatably mounted in the unit and carrying a slidable train of cutters, means for driving the train of cutters; means for rotating the table to cause the cutting train to have lateral motion; and means for adjusting the angular position of the unit to set the train of cutters in desired angular position to cut gears of different angular pitch-cone.

9. In a spiral gear cutting machine the combination with a blank-carrier and means for continuously rotating the same, of a tiltable unit, a table rotatably mounted in the unit and carrying a train of spiral gear cutters, means for driving the train of cutters; means for swinging the latter to cause the cutters to tangentially traverse the blank; means compensating for the difference in speeds of the gear blank carrier and the travel of the cutter-train and means for adjusting the angular position of the unit to set the train of cutters in desired angular position to cut gears of different angular pitch-cone.

10. A spiral gear cutting machine the combination of a blank-carrier and means for continuously rotating the same, of a tiltable unit comprising an annular carrier tiltably mounted, a table carried by the carrier, a train of cutters carried by the table and disposed in the direction of the apex of the pitch-cone of the gear-blank; means for driving the cutters, the edge of the table being toothed to present a worm wheel; means including a worm intermeshing with the worm wheel for rotating the table and means compensating the speeds of the blank-carrier, the rotation of the table and the travel of the cutters for the purpose set forth.

11. In a spiral gear cutting machine the combination with a machine frame, a blank carrier and means for continuously rotating the blank carrier, of a tiltable unit consisting of an annular carrier having trunnions journalled in the machine frame, a table mounted rotatably in the carrier, a train of spiral gear cutters carried by the table, means for driving the train of cutters; means for rotating the table in the carrier to swing the train of cutters tangentially across the blank and means compensating the speeds of the blank carrier, the rotation of the table and the travel of the cutters, for the purpose set forth.

12. In a spiral gear cutting machine a tiltable unit comprising an annular carrier, a circular table rotatably mounted in the carrier and having a surrounding perpendicular side wall or flange with its top edge outwardly flanged and toothed to present a worm wheel.

13. In a spiral gear cutting machine the combination of a blank carrier and means for continuously rotating the same, a tool race constructed and arranged to be swung upon an axis coincident with the apex of the pitch cone of the gear blank, said toolrace having a portion of its length disposed in a plane parallel to the inclined plane of the pitch-cone, a train of cutters slidably mounted in said toolrace and constructed and arranged to cut into the periphery of the gear blank, means for driving the cutter train, means for moving said toolrace upon its axis and tangentially across the gear-blank and means synchronizing the speeds of the gear-blank and tangential motion and the travel of the cutters, for the purpose set forth.

14. In a spiral gear cutting machine the combination with a slidable train of cutters and means for operating the same, of means for turning the train bodily to change the angular position of the cutting operation.

15. In a spiral gear cutting machine the combination with a gear blank carrier and means for rotating the same continuously, of a train of cutting tools, means for imparting continuous travel to the train, means for swinging the train on a pivot coincident with the apex of the pitch-cone of the blank to cause lateral movement of the same tangentially to the gear blank and means for turning the train of cutters bodily on a pivot near the middle of the train and substantially coincident with the end of the cut in the blank and means synchronizing the turning movement with the coincidence of the lateral motion of the cutting train with the zenith of the gear blank and means compensating for the difference in speeds of the gear blank carrier and travel of the cutting train, and means for adjusting the angular position of the train of cutters to cut gears of different angular pitch-cone.

16. In a spiral gear cutting machine the combination of a blank carrier and means for continuously rotating the same, a train of cutters disposed in the direction of the apex of the pitch-cone of the gear blank, means for driving the cutting train, means for swinging the cutting train to cause the cutters to traverse the gear blank tangentially and having the cutting train mounted therein, said means being rotatable upon an axis intersecting the vertex of the said pitch-cone and consisting of a unit carrying a toolrace in which the cutters are adapted to travel, and means for turning the train of cutters bodily on a pivot near the middle of the train and substantially coinciding with the end of the cut in the blank and synchronizing the turning movement with the coincidence of the lateral motion of the cutting train with the zenith of the gear blank, and means compensating for the difference in speeds of the gear blank carrier and travel of the cutting train.

17. In a spiral gear cutting machine the combination of a blank carrier and means for continuously rotating the same, a train of cutters disposed in the direction of the apex of the pitch-cone of the gear blank, means for driving the cutting train, means for swinging the cutting train to cause the cutters to traverse the gear blank tangentially and having the cutting train mounted therein, said means being rotatable upon an axis intersecting the vertex of the said pitch-cone and consisting of a unit carrying a toolrace in which the cutters are adapted to travel, means compensating for the difference in relative speeds of the gear blank carrier and travel of the cutting train, and means for adjusting the angular position of the toolrace to cut gears of different angular pitch-cone and means for turning the train of cutters bodily on a pivot near the middle of the train and substantially coinciding with the end of the cut in the blank and means synchronizing the turning movement with the coincidence of the lateral motion of the cutting train with the zenith of the gear blank.

18. In a spiral gear cutting machine the combination with a blank carrier, and means for continuously rotating the same, of a tiltable unit carrying a train of spiral-gear cutters, means for driving the train of cutters, means for swinging the latter to cause the cutters to tangentially traverse the blank, and means for turning the train of cutters bodily on a pivot near the middle of the train and substantially coinciding with the end of the cut in the blank and means synchronizing the turning movement with the coincidence of the lateral motion of the cutting train with the zenith of the gear blank.

19. In a spiral gear cutting machine the combination of a blank carrier, a member rotatable upon an axis intersecting the vertex of the pitch-cone of the gear blank, a train of cutters carried by and rotatable with the member and disposed in the direction of the apex of the pitch-cone, power means, operating connection between the power means and the train of cutters, means for swinging the member to cause the cutters to traverse the gear blank tangentially; means for rotating the gear blank; means compensating for the difference in relative speeds of the gear blank carrier and tangential motion of the cutters consisting of a compensating mechanism for compensating between the speed of the cutters and the different speed of the gear blank due to the difference in length between the radius of the cutter and radius of the gear blank, such compensating mechanism controlling the transmission of power from the power mechanism to the gear blank carrier and the tangential swinging member, a supplemental compensating mechanism compensating for the difference in speed of the tangential swing of the member and the rotation of the gear blank.

20. In a spiral-gear cutting machine the combination with a blank carrier, and means for continuously rotating the same, of a tiltable unit carrying a train of spiral-gear cutters, means for driving the train of cutters, means for swinging the latter to cause the cutters to tangentially traverse the blank, and means for turning the train of cutters bodily on a pivot near the middle of the train and substantially coinciding with the end of the cut in the blank and synchronizing the turning movement with the coincidence of the lateral movement of the cutting train with the zenith of the gear blank and means compensating for the difference in speeds of the gear blank carrier, lateral motion of the cutting train and travel of the train.

21. The combination of a driven train of cutters pivoted between its ends; means for swinging the train laterally upon a center at a point in a line which is a projection of the train; and means for turning the train on its pivot during its lateral movement.

22. The combination of a driven train of cutters pivoted between its ends; means for swinging the train laterally upon a center at a point in a line which is a projection of the train; and means for turning the train on its pivot during its lateral movement, consisting of a cam mechanism and means constructed and arranged to be actuated thereby coincidental with the transit of the train across the zenith of the gear blank.

23. In a spiral gear cutting machine the combination with a blank carrier and means for continuously rotating the same, of a tiltable unit, a table rotatably mounted in the unit and carrying a train of spiral-gear cutters, means for driving the train of cutters, means for swinging the latter to cause the cutters to tangentially traverse the blank; and means for turning the train of cutters bodily on a pivot near the middle of the train and substantially coinciding with the end of the cut in the blank and synchronizing the turning movement with the transit of the pivot across the zenith of the gear blank, and means compensating for the difference in speeds of the gear blank carrier, lateral motion of the cutting train and travel of the train consisting of a cam plate upon the member and presenting a cam groove, a pin upon the member and presenting a cam groove, a pin engaging the cam groove and means movably attaching the pin to the toolrace.

24. In a spiral gear cutting machine the combination of a blank carrier, means for continuously rotating the same, a member pivoted on an axis intersecting the axis of the gear-blank carrier and carrying a toolrace pivoted between its ends and disposed in the direction of the apex of the pitch-cone of the gear-blank; a train of cutters contained in the toolrace; means for driving the train of cutters, means for swinging the member to cause the cutters to traverse the gear-blank tangentially; means for turning the train on its pivot during its lateral movement and synchronizing the turning movement with the transit of the pivot across the zenith of the gear blank; means compensating for the difference in speeds of the gear blank carrier, the swinging of the cutters and the travelling of the cutter train.

25. In a bevel gear cutting machine the combination with a continuously rotating gear blank carrier, of a train of cutters constructed and arranged to traverse the periphery of the blank in paths intersecting the vertex of the pitch cone of the latter, combined means for rotating the gear blank and actuating the cutters, means for synchronizing the cutters with the gear blank for the purpose set forth, and means for rotatably adjusting the position of the gear blank relatively to the cutters during the cutting operation for the purpose of increasing the width of the cut.

26. In a bevel gear cutting machine, the combination with a continuously rotating blank carrier rotatable on a stationary axis, of a plurality of cutters adapted to successively traverse the periphery of the blank for the purpose of forming cuts spaced throughout the periphery of the blank, synchronizing mechanism for causing the cutter to register with the initial cuts upon their successive strokes, and means for causing transverse movement of the cutters for the purpose of progressively increasing the side faces of the teeth.

27. In a bevel gear cutting machine, the combination with a rotary blank carrier; of a toolrace having a portion of its length disposed in an inclined plane parallel to the bevelled face of the blank, said toolrace having straight parallel sides and curved ends presenting a raceway of substantially elliptical form, a plurality of cutter blocks slidably mounted in said raceway with their ends abutting, each of said blocks having a toothed side for the purpose of collectively presenting a continuous rack, means intermeshing with said rack for moving the cutter blocks around the raceway, said toolrace having a detachable end and means for adjustably mounting said detachable end upon the main body of the toolrace whereby the blocks are maintained in relative abutting position.

28. In a spiral gear cutting machine, the combination with the machine frame having a vertical slideway thereon, of a carrier slidably carried in said slideway, a vertical blank-carrying spindle journalled in said carrier, means for continuously rotating said spindle, a train of cutters disposed in the direction of the apex of the pitch cone of the gear blank and above the same, and means for moving the carrier vertically upon the slideway for the purpose of adjusting the blank relatively to the cutting train, said carrier being stationary during the entire cutting operation.

29. In a spiral gear cutting machine, the combination with the machine frame having a slideway thereon, a train of cutters disposed in the direction of a generatrix of the pitch cone of the gear blank, and means for driving said train; of a carrier slidably mounted in said slideway, a blank-carrying spindle journalled in said carrier, means for rotating the spindle, means for moving the carrier in the slideway for the purpose of adjusting the blank relatively to the cutting train, said means consisting of a bracket mounted upon the machine frame, an internally screw-threaded bushing mounted on said carrier, a feed-screw journalled in said bracket and extending through the bushing and intermeshing therewith, a gear upon said feed-screw and rotatable in unison therewith, a shaft journalled in the machine frame, a gear keyed upon said shaft and intermeshing with said first-mentioned gear, and means for manually rotating said shaft.

30. In a spiral gear cutting machine, the combination with a train of cutters disposed in the direction of the apex of the pitch cone of the gear blank, and means for driving said train; of blank-supporting means, means for adjusting the blank-supporting means relatively to the cutting train, and means for securing the blank-supporting means in the adjusted position, said means consisting of a projection upon the machine frame and a clamp mounted upon the carrier and adapted to engage said projection.

31. In a spiral gear cutting machine such as claimed in claim 30 in which the spindle is axially adjusted, the combination with a train of cutters disposed in the direction of the apex of the pitch cone of the gear blank and means for driving said train; of a blank-supporting spindle, means for axially adjusting the spindle relatively to the cutting train for the purpose set forth, means for continuously rotating said spindle said means including a gear rigidly mounted upon the spindle and rotatable in unison therewith, a shaft, a pinion mounted upon said shaft in intermeshing relation with said gear, said pinion being adapted to move axially upon said shaft in unison with axial movement of the spindle, and means for rotating said shaft.

32. In a spiral gear cutting machine, the combination with a train of cutters disposed in the direction of the apex of the pitch cone of the gear blank and means for driving said train; of a blank-supporting spindle, means for axially adjusting the spindle relatively to the cutting train for the purpose set forth, means for continuously rotating said spindle, said means including a gear rigidly mounted upon the spindle and rotatable in unison therewith, a shaft, a pinion mounted upon said shaft and in intermeshing relation with said gear, said pinion being adapted to move axially upon said shaft in unison with axial movement of the spindle, means for rotating said shaft, and means for causing axial movement of the pinion independently of said spindle for the purpose set forth.

33. In a spiral gear cutting machine, the combination with a blank-carrying spindle, of means for continuously rotating the same, said means including a spiral toothed gear keyed upon the spindle, a shaft, a spiral toothed pinion mounted upon said shaft and rotatable in unison therewith, said pinion being in intermeshing engagement with said gear and movable axially relatively thereto, and means for causing axial movement of the pinion relatively to said gear for the purpose of rotating the spindle independently of said continuous rotating means.

34. In a spiral gear cutting machine the combination with a blank-carrying spindle, of means for continuously rotating the same, and manually operated means for rotating the spindle independently of the first-mentioned means, said last-mentioned means consisting of a feed-screw, a nut screwed upon said feed-screw, means preventing rotation of the nut and effecting a connection therebetween and the pinion whereby they move axially in unison, said feed-screw being fixed against axial movement relatively to the nut, and means for manually rotating said feed-screw.

35. In a spiral gear cutting machine, the combination with the machine frame, a carrier slidably mounted thereon, a gear-blank-carrying spindle journalled in said carrier and movable therewith, means for moving the carrier in a direction parallel to the axis of the spindle, means for continuously rotating the spindle, said means including a spiral toothed gear rigidly mounted upon the spindle, a shaft journalled in fixed position upon the machine frame and disposed parallel to the spindle, a spiral toothed pinion mounted upon said shaft and in intermeshing relation with said gear, said pinion being movable axially upon said shaft, means for operatively connecting the pinion to the carrier whereby movement of the carrier causes axial movement of the pinion, and means effecting axial movement of the pinion independently of the carrier.

36. In a spiral gear cutting machine, the combination with the machine frame, a carrier slidably mounted thereon, a gear blank-carrying spindle journalled in said carrier and movable therewith, means for moving the carrier in a direction parallel to the axis of the spindle, means for continuously rotating the spindle, said means including a spiral toothed gear rigidly mounted upon the spindle, a shaft journalled in fixed position upon the machine frame and disposed parallel to the spindle, a spiral toothed pinion mounted upon said shaft and in intermeshing relation with said gear, said piston being movable axially upon said shaft, means for operatively connecting the pinion to the carrier whereby movement of the carrier causes axial movement of the pinion, and manually operated means effecting axial movement of the pinion independently of the carrier.

37. In a spiral gear cutting machine, the combination with the machine frame, a carrier slidably mounted thereon, a gear blank-carrying spindle journalled in said carrier and movable therewith, means for moving the carrier in a direction parallel to the axis of the sipndle, means for continuously rotating the spindle, said means including a gear rigidly mounted upon the spindle, a shaft journalled in fixed position upon the machine frame and disposed parallel to the spindle, a pinion mounted upon said shaft and in intermeshing relation with said gear, said pinion being movable axially upon said shaft, means operatively connecting the pinion to the carrier whereby movement of the carrier causes axial movement of the pinion, means effecting axial movement of the pinion independently of the carrier, said last-mentioned means being mounted upon the latter and movable therewith, said means for operatively connecting the pinion to the carrier consisting of an arm forming an integral part of the carrier and having an opening through which said shaft passes, and a sleeve journalled in said opening in position encircling said shaft and connected to said pinion to rotate in unison therewith.

38. In a spiral gear cutting machine, the combination with the machine frame, a carrier slidably mounted thereon and having a laterally projecting arm, a gear blank-carrying spindle journalled in said carrier and movable therewith, means for moving said carrier in a direction parallel to the axis of the spindle; means for continuously rotating the spindle, said means including a spiral toothed gear rigidly mounted upon the spindle and rotatable in unison therewith, a shaft journalled in fixed position upon the machine frame and disposed parallel to the spindle, a spiral toothed pinion mounted upon said shaft and in intermeshing relation with the gear, said pinion being movable axially upon said shaft, means operatively connecting the pinion to the carrier whereby movement of the latter causes axial movement of the pinion, means effecting axial movement of the pinion independently of the carrier, said last-mentioned means consisting of a bracket mounted upon said arm, a feed-screw journalled in said bracket, a nut movable axially upon said feed-screw, means preventing rotation of the nut and rigidly connecting the latter to said pinion whereby the nut and pinion are caused to move axially in unison, and manually operated means for rotating said feed-screw.

39. In a spiral gear cutting machine, the combination with the machine frame, a carrier slidably mounted thereon, a gear blank-carrying spindle journalled in said carrier and movable therewith, means for moving the carrier in a direction parallel to the axis of the spindle, means for continuously rotating the spindle, said means including a gear rigidly mounted upon the spindle, a shaft journalled in fixed position upon the machine frame and disposed parallel to the spindle, a pinion mounted upon said shaft and in intermeshing relation with said gear, said pinion being movable axially upon said shaft, means operatively connecting the pinion to the carrier whereby movement of the carrier causes axial movement of the pinion, said last mentioned means consisting of a bracket forming an integral part of the carrier and having an opening through which said shaft passes, a sleeve journalled in said opening in position encircling said shaft and connected to said pinion to rotate in unison therewith, and means effecting axial movement of the pinion independently of the carrier, said last mentioned means being mounted upon the latter and movable therewith and consisting of a bracket mounted on said arm, a feed-screw journalled in said bracket, a nut movable axially upon said feed-screw, means preventing rotation of the nut and rigidly connecting the latter to said sleeve, manually operated means for rotating said feed-screw, said last mentioned means consisting of a gear upon said feed-screw and rotatable in unison therewith, a fixed shaft mounted upon said bracket, a sleeve rotatably mounted upon said fixed shaft, a gear mounted upon said sleeve and rotatable in unison therewith and adapted to intermesh with the gear on the feed-screw, and a hand-wheel adapted to rotate said sleeve.

40. In a spiral gear cutting machine the combination with the machine frame having a slideway thereon, a train of cutters disposed in the direction of a generatrix of the pitch-cone of the blank, and means for driving said train, of a carrier slidably mounted in said slideway, a blank carrying spindle journalled in said carrier, means for continuously rotating said spindle, means for adjusting the blank relatively to the cutting train, said means consisting of a feed-screw connected to the carrier and adapted to move the same along the slideway operatively, and means for rotating said feed-screw, means for swinging the cutting train to cause the cutters to traverse the gear blank tangentially, and means compensating for the difference in relative speeds of the gear blank and the traversing motion cutters.

41. In a spiral gear cutting machine the combination with a train of cutters disposed in a generatrix of the pitch-cone of the gear blank, and means for driving said train, of a blank carrying spindle, means for axially adjusting the spindle relatively to the cutting train, means for turning said spindle, said means including a gear rigidly mounted upon the spindle and turning in unison therewith, a shaft, a pinion mounted upon said shaft in intermeshing relation with said gear, said pinion being adapted to move axially upon said shaft in unison with axial movement of the spindle and means for rotating said shaft, means for swinging the cutting train to cause the cutters to traverse the gear blank tangentially and means compensating for the difference in relative speeds of the gear blank and the traversing motion of the cutters.

42. In a spiral gear cutting machine, the combination with a blank carrying spindle, means for turning the same, and manually operated means for turning the spindle independently of the first mentioned means for the purpose set forth, of a train of cutters disposed in the direction of a generatrix of the pitch cone of the gear blank, means for driving said cutters, means for swinging the cutting train to cause the cutters to traverse the gear blank tangentially, and means compensating for the difference in relative speeds of the gear blank and the traversing motion of the cutters.

43. In a spiral gear cutting machine, the combination with a machine frame, a carrier slidably mounted thereon, a gear blank carrying spindle journalled in said carrier and movable therewith, means for moving the carrier in a direction parallel to the axis of the spindle, means for continuously rotating the spindle, said means including a spiral toothed gear rigidly mounted upon the spindle, a shaft journalled in fixed position upon the machine frame and disposed parallel to the spindle, a spiral toothed pinion mounted upon said shaft in intermeshing relation with the gear, said pinion being movable axially upon said shaft, means operatively connecting the pinion to the carrier whereby movement of the carrier causes axial movement of the pinion, said means consisting of an arm forming an integral part of the carrier and having an opening through which said shaft passes, and a sleeve journalled in said opening in position encircling said shaft and connected to said pinion to rotate in unison therewith, means effecting axial movement of the pinion independently of the carrier, said means being mounted upon the latter and movable therewith, and manually operated means effecting axial movement of the pinion independently of the carrier, of a train of cutters disposed in the direction of the apex of the pitch cone of the gear blank, means for driving said cutters, means for swinging the cutting train to cause the cutters to traverse the gear blank tangentially, and means compensating for the difference in relative speeds of the gear blank and the traversing motion of the cutters.

44. In a machine of the type described, a toolrace presenting an endless raceway for the cutting tools, a train of cutters located in the raceway in abutting relation with each other, each cutter of the train having one side toothed to present with the other cutters a rank, the cutting ends of the cutters protruding below the table to cutting position with relation to the blank, and means including a pinion intermeshing with the said rack for imparting continuous travel to the cutters.

45. In a machine of the type described, a toolrace, presenting an endless raceway for the cutting tools, a train of cutters located in the raceway in abutting relation with each other, each cutter of the train having one side toothed to present with the other cutters a rack, the cutting ends of the cutters protruding below the table to cutting position with relation to the blank, and means including a pinion intermeshing with the said rack for imparting continuous travel to the cutters, said means consisting of a driving shaft, a skew pinion keyed on said shaft, a second shaft disposed at an angle to the driving shaft, a skew gear keyed on said second shaft and intermeshing with said pinion and a second pinion keyed on said second shaft and intermeshing with said pinion and a second pinion keyed on said second shaft and intermeshing with said rack.

46. In a machine of the type described, a toolrace presenting an endless raceway for the cutting tools, a train of cutters located in the raceway in abutting relation with each other, each cutter of the train having one side toothed to present with the other cutters a rack, the cutting ends of the cutters protruding below the table to cutting position with relation to the blank, and means including a pinion intermeshing with the said rack for imparting continuous travel to the cutters, said means consisting of a driving shaft, a pulley mounted on said shaft and rotatable relatively thereto, a friction clutch adapted to effect a rotative connection between the former and the latter, a skew pinion keyed on said shaft, a second shaft disposed at an angle to the driving shaft, a skew gear keyed on said second shaft and intermeshing with said pinion and a second pinion keyed on said second shaft and intermeshing with said pinion and a second pinion keyed on said second shaft and intermeshing with said rack.

47. In a machine of the type described, the combination of a supporting means, a toolrace pivotally mounted upon said means, said toolrace presenting an endless raceway for the cutting tools, a train of cutters located in the raceway in abutting relation with each other, each cutter of the train having one side toothed to present with the other cutters a rack, means turning the toolrace upon its supporting means, and means for imparting continuous travel to the cutters, said means being mounted upon the toolrace and adapted to move therewith when the latter is turned.

48. In a machine of the type described the combination of a supporting means including a table, a toolrace pivotally mounted in the table, said toolrace presenting an endless raceway for the cutting tools, a train of cutters located in the raceway in abutting relation with each other, each cutter of the train having one side toothed to present with the other cutters a rack, means turning the toolrace upon its supporting means, and means for imparting continuous travel to the cutters, said means being mounted upon the toolrace and adapted to move therewith when the latter is turned, and consisting of a driving shaft journalled on said toolrace, a pulley mounted on said shaft and rotatable relatively thereto, a skew pinion keyed upon said shaft, a second shaft journalled in said toolrace and disposed at an angle to the driving shaft, a skew gear keyed on said second shaft and intermeshing with said pinion, and a second pinion on said second shaft and intermeshing with said rack.

49. In a machine of the type described, the combination with a carrier, of a unit rotatably mounted upon the carrier, said unit consisting of a table, a toolrace supported in movable relation to the table, a train of cutters located in said toolrace, and means for imparting motion to the cutters within the toolrace.

50. In a machine of the type described, the combination with a carrier, of a unit rotatably mounted upon the carrier, said unit consisting of a table, a toolrace supported in movable relation to the table, a train of cutters located in said toolrace, means for imparting motion to the cutters within the toolrace, means for imparting motion to the cutters within the toolrace and means for rotating the unit on the carrier.

51. In a machine of the type described, the combination of a carrier, a unit rotatably mounted upon the carrier, said unit consisting of a table, a toolrace mounted upon the table and adapted to be moved relatively thereto, a train of cutters located in said toolrace and means for imparting motion to the cutters within the toolrace, said means being mounted upon the toolrace and adapted to move therewith.

52. In a machine of the type described, the combination of a carrier, a unit rotatably mounted upon the carrier, said unit consisting of a table, a toolrace mounted upon the table and adapted to be moved relatively thereto, a train of cutters located in said toolrace in abutting relation with each other, each cutter of the train having one side toothed to present with the other cutters a rack, and means for imparting motion to the cutters within the toolrace, said means being mounted upon the toolrace and adapted to move therewith and consisting of a driving shaft journalled on said toolrace, a pulley mounted on said shaft and rotatable relatively thereto, a skew pinion keyed upon said shaft, a second shaft journalled in said toolrace and disposed at an angle to the driving shaft, a skew gear keyed on said second shaft and intermeshing with said pinion, and a second pinion on said second shaft and intermeshing with said rack.

53. In a machine of the type described, the combination with a carrier, of a table rotatably mounted upon the carrier, and means for rotating said table, said means consisting of a gear constituting an integral part of the table, a second gear rotatably mounted in the carrier and intermeshing with the first mentioned gear, and means for effecting relative adjustment between the gears for the purpose set forth.

54. In a machine of the type described, the combination with a carrier, of a table rotatably mounted upon the carrier, and mechanism for rotating said table, said mechanism including a worm wheel upon the table and rotatable therewith, a shaft journalled in said carrier, a worm keyed upon said shaft and intermeshing with said wormwheel, and means for adjusting the worm relatively to the worm wheel for the purpose set forth, said means consisting of an adjustable eccentric bearing for said shaft.

55. In a machine of the type described, combination with the machine frame, and a tiltable carrier having trunnions journalled in said frame, one of said trunnions being hollow, of a table rotatably mounted upon said carrier, and means for rotating said table, said means consisting of a wormwheel upon said table and rotatable therewith, a worm rotatably mounted upon the carrier and intermeshing with said wormwheel, a shaft extending through said hollow trunnion, a train of gears mounted upon said table and rotatively connected to said shaft and a second train of gears mounted upon said carrier and effecting a rotative connection between the said shaft and worm.

56. In a machine of the type described, the combination with a carrier, of a table rotatably mounted upon the carrier, means for rotating said table and manually operated means for rotating the table independently of said first mentioned means.

57. In a machine of the type described, the combination with the machine frame and a tiltable carrier having trunnions journalled in said frame, one of said trunnions being hollow, of a table rotatably mounted upon said carrier, means for rotating said table, said means including a shaft disposed tangentially to the table, a worm mounted upon said shaft and rotatable therewith, and a worm wheel forming an integral part of the table and intermeshing with said worm and means for manually rotating said table, said means consisting of a hand-wheel keyed upon said shaft.

58. In a spiral gear cutting machine, the combination with a carrier, a table rotatably mounted upon said carrier, main driving mechanism supported upon the table and rotatable therewith, means for rotating said table, a blank supporting means, means for continuously rotating said blank supporting means and means effecting a rotative connection between the main driving mechanism and the mechanism for rotating the table and gear blank, said means including an annular floating rack toothed on opposite sides and mounted upon the carrier in position encircling the table, said rack being rotatable relatively to both the table and carrier, a pinion rotatably mounted upon said table and rotatable therewith and intermeshing with one side of said rack, and a second pinion rotatably mounted in fixed position relatively to the rack and rotatably connected to the driving mechanism for the table and gear blank.

59. In a spiral gear cutting machine, the combination with a blank supporting means, means for continuously rotating the blank supporting means, a carrier, and a table rotatably mounted upon said carrier, main driving mechanism supported upon said table and rotatable therewith, a train of cutters mounted upon the table, means for driving said cutter train, means for rotating said table for the purpose of causing the cutters to traverse the gear blank tangentially, of means compensating for the difference in speeds of the gear blank supporting means, the traversing motion and the travel of the cutter train, said means effecting a rotative connection between the main driving mechanism and the mechanisms for rotating the table and gear blank.

60. In a spiral gear cutting machine, the combination with a blank supporting means, means for continuously rotating the blank supporting means, a carrier, and a table rotatably mounted upon said carrier, main driving mechanism supported upon said table and rotatable therewith, a train of cutters mounted upon the table, means for driving said cutter train, means for rotating said table for the purpose of causing the cutters to traverse the gear blank tangentially, of means compensating for the difference in speeds of the gear blank supporting means, the traversing motion and the travel of the cutter train, said means effecting a rotative connection between the main driving mechanism and the mechanism for rotating the table and gear blank, said last mentioned means consisting of a floating annular rack toothed on opposite sides and mounted upon the carrier in position encircling the table, said rack being rotatable relatively to both the table and carrier, a pinion rotatably mounted upon said table and rotatable therewith and intermeshing with one side of said rack, and a second pinion rotatably mounted in fixed position relatively to the rack and rotatably connected to the driving mechanisms for the table and gear blank.

61. In a spiral gear cutting machine, the combination with a machine frame, a tiltable carrier having trunnions journalled in said frame, one of said trunnions being hollow, a shaft extending through and rotatably mounted in said hollow trunnions, a table rotatably mounted upon said carrier, a train of cutters mounted upon said table and disposed in the direction of the apex of the pitch-cone of the gear blank, means for driving said cutting train, main driving mechanism supported upon said table and adapted to rotate therewith, said mechanism being rotatably connected to the means for driving said cutter train, means for rotating said table for the purpose of causing the cutters to traverse the gear blank tangentially, said means including a worm wheel forming an integral part of the table, a shaft mounted upon the carrier and disposed tangentially to the table, a worm keyed upon said shaft and intermeshing with said worm wheel, and a train of gears effecting a rotative connection between said worm and the shaft extending through said hollow trunnions, blank supporting means for continuously rotating said blank supporting means, said means including a shaft disposed at right angle to the axial plane of the shaft extending through the trunnion and having a gear keyed thereon, a second gear intermeshing with said last mentioned gear and keyed upon said shaft in the trunnion and means compensating for the difference in speeds of the gear blank supporting means, traversing motion and travel of the cutter train, said last mentioned means effecting a rotative connection between the main driving mechanism and the shaft extending through the hollow trunnion.

62. In a spiral gear cutting machine, the combination with a machine frame, a tiltable carrier having trunnions journalled in said frame, one of said trunnions being hollow, a shaft extending through and rotatably mounted in said hollow trunnions, a table rotatably mounted upon said carrier, a train of cutters mounted upon said table and disposed in the direction of the apex of the pitch-cone of the gear blank, means for driving said cutting train, main driving mechanism supported upon said table and adapted to rotate therewith, said mechanism being rotatably connected to the means for driving said cutter train, means for rotating said table for the purpose of causing the cutters to traverse the gear blank tangentially, said means including a worm wheel forming an integral part of the table, a shaft mounted upon the carrier and disposed tangentially to the table, a worm keyed upon said shaft and intermeshing with said worm wheel, and a train of gears effecting a rotative connection between said worm and the shaft extending through said hollow trunnions, blank supporting means, said means including a shaft disposed at right angle to the axial plane of the shaft extending through the trunnion and having a gear keyed thereon, a second gear intermeshing with said last mentioned gear and keyed upon said shaft in the trunnion and means compensating for the difference in speed of the gear blank supporting means, traversing motion and travel of the cutter train, said last mentioned means effecting a rotative connection between the main driving mechanism and the shaft extending through the hollow trunnion, said means consisting of an annular floating rack toothed on opposite sides and mounted upon the carrier in position encircling the table, said rack being rotatable therewith and intermeshing with one side of said rack, said pinion being rotatably connected to the main driving mechanism and a second pinion upon said shaft extending through the hollow trunnion and intermeshing with the opposite sides of said rack.

63. In a spiral gear cutting machine, the combination with a carrier, a table rotatably mounted upon said carrier, a train of cutters upon said table and disposed in the direction of the apex of the pitch cone of the blank, means for driving said cutter train, means for rotating said table to cause the cutter train to traverse the gear blank tangentially, a blank supporting means, means for continuously rotating said blank supporting means, main driving mechanism mounted upon said table and operatively connected to the driving mechanisms for the cutter train, table and gear blank, and means compensating for the difference in speeds of the blank, traversing motion, and travel of the cutter train, said means including a rack mounted in fixed position upon the carrier, and mechanism mounted upon the table and rotatable therewith, said mechanism effecting an operative connection between the main driving mechanism and said rack and consisting of a pinion intermeshing with said rack and differential mechanism rotatively connected to said pinion and main driving mechanism.

64. In a spiral gear cutting machine, the combination with a blank carrier, means for continuously rotating the same, a train of cutters disposed in a plane parallel to the inclined plane of the pitch cone of the blank, means for driving said cutters in the direction of the apex of said pitch cone, means for swinging said cutter train to cause the cutters to traverse the gear blank tangentially, the radius of said swinging motion being greater than that of the gear blank, and synchronizing means including mechanism for compensating for the difference between the speed of rotation of the gear blank and speed of travel of the cutters due to the swinging of the cutter train and mechanism for compensating for the difference in speeds of the gear blank and cutters due to the difference in radii of the swinging motion of the cutter train and gear blank.

65. In a machine of the type described, the combination with a blank-supporting means, means for rotating the blank-supporting means, of a table, a train of cutters supported upon the table and movable in the direction of the apex of the pitch cone of the gear blank, means for rotating the table for the purpose of causing the cutters to move tangentially to the gear blank, said means including a pair of spaced gears rotating about parallel axes, means for reversing the direction of rotation of said table, said last mentioned means consisting of a second pair of gears intermeshing with each other and located between the gears of the first mentioned pair, a member rotatably carrying said second gears and movable relatively to the first mentioned gear whereby rotative connection is effected between the first mentioned pair through one gear of the second pair and in another position in which the rotative connection is effected through both gears of the second pair.

66. In a machine of the type described, the combination with blank-supporting means, means for rotating the blank-supporting means; of a table, a train of cutters supported upon the table and movable in the direction of the apex of the pitch cone of the gear blank, means for rotating the table for the purpose of causing the cutters to move tangentially to the gear blank, said means including a pair of spaced gears rotating about parallel axes, means for reversing the direction of rotation of said pair of gears intermeshing with each other and located between the gears of the first-mentioned pair, means carrying said second pair of gears movable in and out of intermeshing relation with the gears of said first-mentioned pair and means for manually rotating the table independently of said first-mentioned rotating means.

67. In a spiral gear cutting machine an endless toolrace and means for propelling a train of cutters therein.

68. In a spiral gear cutting machine an endless toolrace, a train of cutters movably mounted within the toolrace and means for propelling the train of cutters therein.

In testimony whereof I have signed my name to this specification.

CHARLES H. TAYLOR.